United States Patent
Pun et al.

(10) Patent No.: US 7,944,971 B1
(45) Date of Patent: May 17, 2011

(54) ENCODING VIDEO

(75) Inventors: Thomas Pun, Sunnyvale, CA (US);
Roger Kumar, San Francisco, CA (US);
Xiaochun Nie, Cupertino, CA (US);
Hsi-Jung Wu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1057 days.

(21) Appl. No.: 10/429,101

(22) Filed: May 1, 2003

Related U.S. Application Data (60) Provisional application No. 60/395,962, filed on Jul. 14, 2002.

(51) Int. Cl.
*H04N 7/12* (2006.01)
*H04N 11/02* (2006.01)
*H04N 11/04* (2006.01)

(52) U.S. Cl. .............................. 375/240.13; 348/412.1

(58) Field of Classification Search ............. 375/240.13, 375/240.16, 240.24; 348/413.1, 414.1, 416.1, 348/418.1, 421.1
See application file for complete search history.

(56) References Cited

U.S. PATENT DOCUMENTS

| | | | | |
|---|---|---|---|---|
| 4,394,774 A * | 7/1983 | Widergren et al. | ............ | 382/250 |
| 5,101,280 A * | 3/1992 | Moronaga et al. | ............ | 382/239 |
| 5,214,507 A * | 5/1993 | Aravind et al. | ............ | 348/390.1 |
| 5,253,056 A * | 10/1993 | Puri et al. | ................. | 375/240.01 |
| 5,260,782 A * | 11/1993 | Hui | ......................... | 375/240.15 |
| 5,347,308 A * | 9/1994 | Wai | ......................... | 375/240.23 |
| 5,473,384 A * | 12/1995 | Jayant et al. | ................. | 348/470 |
| 5,856,848 A * | 1/1999 | Fujiwara et al. | ......... | 375/240.13 |
| 5,903,669 A * | 5/1999 | Hirabayashi | ................. | 382/232 |
| 6,381,364 B1 * | 4/2002 | Gardos | ........................ | 382/173 |
| 6,792,373 B2 * | 9/2004 | Tabor | .......................... | 702/108 |

* cited by examiner

*Primary Examiner* — Marsha D Banks Harold
*Assistant Examiner* — Jeremaiah C Hallenbeck-Huber
(74) *Attorney, Agent, or Firm* — Adeli & Tollen LLP (57) ABSTRACT

Some embodiments of the invention provide a method for encoding a video signal that is formed by a series of successive images. Each image includes several sections, and each section has a set of image values. To encode a particular section of a particular image, the method initially partitions the particular section into several sub-sections. For each of at least two particular sub-sections, the method then computes a statistical parameter regarding the image values of the particular sub-section. The method compares the computed statistical parameters, and based on the comparison, selects an encoding technique from a set of encoding techniques to encode the particular section. In some embodiments, the set of encoding schemes includes a first scheme that encodes the selected section without reference to any other section of any other image, and a second scheme that encodes the selected section by reference to at least one other section.

24 Claims, 7 Drawing Sheets

ENCODING VIDEO

CLAIM OF BENEFIT

This patent application claims the benefit of U.S. Provisional Patent Application 60/395,962, filed Jul. 14, 2002. This provisional application is incorporated herein by reference.

FIELD OF THE INVENTION

The present invention is directed towards encoding video.

BACKGROUND OF THE INVENTION

Figure 1:
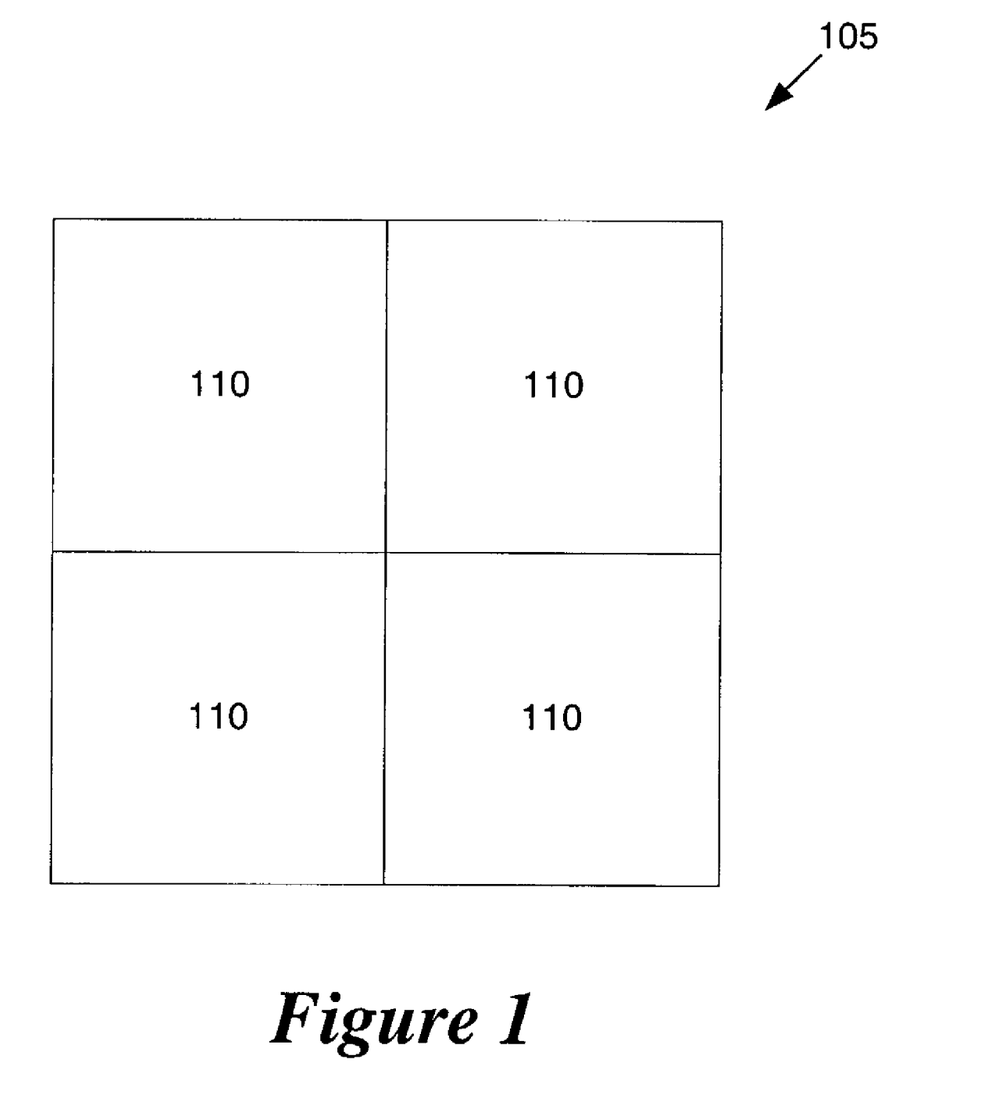
FIG. 1 illustrates a 16×16 macroblock with four 8×8 blocks.

MPEG encoders typically divide a video frame into macroblocks and blocks. Currently, as shown in FIG. 1, a macroblock 105 is a 16-by-16 set of pixels that can be divided into four blocks 110, which are each an 8-by-8 set of pixels. In some cases, the image within a macroblock can be represented by four 8-by-8 luminance blocks (i.e., one luminance block for each block 110) and two 8×8 chrominance blocks (where one chrominance block is a Cr color block, and the other chrominance block is a Cb color block). In other words, the image within a macroblock at times is represented by one luminance value for each pixel in the macroblock and 64 Cr values and 64 Cb values.

MPEG encoders typically perform motion estimation on a macroblock level, while performing DCT encoding on a block level. Such encoders either encode a macroblock as an interblock or an intrablock. Traditionally, an interblock is a motion compensated macroblock (i.e., it is a block that is defined by reference to past and/or future macroblocks), whereas an intrablock is coded as a brand new block (i.e., it is a block that is not defined by reference to past and/or future macroblocks). Newer intrablock encoding schemes allow a macroblock to be defined with respect to another block within the same frame.

MPEG encoders encode a macroblock as an intrablock if its energy value is less than its estimated error value as an interblock. Some prior encoders compute the macroblock's energy as the sum of the coefficient values of all pixels in the macroblock. This approach of prior encoders does not take into account the texture of the macroblocks that they are encoding, and this results in artifacts in the decoded image. Therefore, there is a need in the art for a video encoder that takes into account the texture of sections of video images that it is encoding in order to avoid artifacts in the decoded images.

SUMMARY OF THE INVENTION

Some embodiments of the invention provide a method for encoding a video signal that is formed by a series of successive images. Each image includes several sections, and each section has a set of image values. To encode a particular section of a particular image, the method initially partitions the particular section into several sub-sections. For each of at least two particular sub-sections, the method then computes a statistical parameter regarding the image values of the particular sub-section. The method compares the computed statistical parameters, and based on the comparison, selects an encoding technique from a set of encoding techniques to encode the particular section. In some embodiments, the set of encoding schemes includes a first scheme that encodes the selected section without reference to any other section of any other image, and a second scheme that encodes the selected section by reference to at least one other section.

In some embodiments, the method initially selects a section. It then determines whether the image values in the section are centered about a particular value. If the selected section's image values are centered about the particular value, the method uses a first equation to compute a first metric score for the image values of the selected section. Otherwise, the method uses a second equation to compute a second metric score for the image values of the selected section. The method next selects an encoding scheme from a set of encoding schemes based on the computed metric score, and then encodes the selected section according to the selected encoding scheme. In some embodiments, the method determines whether the image values of the particular section are centered about a particular value by comparing the image values of each sub-section with image values of the other sub-sections. In some embodiments, this comparison entails: (1) for a first sub-section, computing a first energy value that expresses the deviation of the image values of the first sub-section from an average of the image values of the first sub-section, (2) for a second sub-section, computing a second energy value that expresses the deviation of the image values of the second sub-section from an average of the image values of the second sub-section, (3) determining whether the first and second energy values differ by more than a first threshold; and (4) if the first and second energy values differ by more than the first threshold, specifying that the selected section's image values are not centered about the particular value.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for encoding a video signal that is formed by a series of successive images. Each image includes several sections, and each section has a set of image values. To encode a particular section of a particular image, the method initially partitions the particular section into several sub-sections. For each of at least two particular sub-sections, the method then computes a statistical parameter regarding the image values of the particular sub-section. Different embodiments compute different statistical parameters. Some embodiments described below compute the mean average of the image values. Other embodiments, however, might compute variance, rate of change, or delta values (e.g., delta high and/or delta low values).

The method compares the computed statistical parameters, and based on the comparison, selects an encoding technique from a set of encoding techniques to encode the particular section. In some embodiments, the set of encoding schemes includes a first scheme that encodes the selected section without reference to any other section of any other image, and a second scheme that encodes the selected section by reference to at least one other section.

In some embodiments, the method initially selects a section. It then determines whether the image values in the section are centered about a particular value. If the selected section's image values are centered about the particular value, the method uses a first equation to compute a first metric score for the image values of the selected section. Otherwise, the method uses a second equation to compute a second metric score for the image values of the selected section. The method next selects an encoding scheme from a set of encoding schemes based on the computed metric score, and then encodes the selected section according to the selected encoding scheme. In some embodiments, the method determines whether the image values of the particular section are centered about a particular value by comparing the image values of each sub-section with image values of the other sub-sections. In some embodiments, this comparison entails: (1) for a first sub-section, computing a first energy value that expresses the deviation of the image values of the first sub-section from an average of the image values of the first sub-section, (2) for a second sub-section, computing a second energy value that expresses the deviation of the image values of the second sub-section from an average of the image values of the second sub-section, (3) determining whether the first and second energy values differ by more than a first threshold; and (4) if the first and second energy values differ by more than the first threshold, specifying that the selected section's image values are not centered about the particular value.

Several embodiments of the invention will now be further described by reference to FIG. 2. These embodiments are an MPEG encoder that encodes frames of video. Specifically, in these embodiments, an image is a frame of video, the sections of an image are macroblocks of the frame, and the sub-sections are blocks within the macroblocks. In the embodiments described by reference to FIG. 2, each macroblock is a 16-by-16 set of pixels. As described above by reference to FIG. 1, a 16-by-16 macroblock 105 can be divided into four 8-by-8 blocks 110.

In the embodiments described by reference to FIG. 2, the image within a macroblock is represented by four 8-by-8 luminance blocks (i.e., one luminance block for each block 110) and two 8×8 chrominance blocks (where one chrominance block is a Cr color block, and the other chrominance block is a Cb color block). In other words, the image within a macroblock is represented by one luminance value for each pixel in the macroblock and 64 Cr values and 64 Cb values.

However, the embodiments described by reference to FIG. 2 do not rely on the chrominance values, but rather use the luminance values of its blocks in order to determine how to encode the macroblock. One of ordinary skill will realize that other embodiments might account for chrominance values as well. Other embodiments might not even express the image values in terms of luminance and/or chrominance, but might instead use another set of component color values. In place of 16-by-16 macroblocks and 8-by-8 blocks in video frames, other embodiments might also use with other types of images and section and sub-sections of images (e.g., 8-by-4, 8-by-8, 4-by-4, or n-by-m blocks, where n and m are integer values).

The embodiments described by reference to FIG. 2 encode a macroblock as either an intrablock or an interblock. As mentioned above, an intrablock encoding encodes a macroblock in a manner that does not refer to any other macroblocks of any other frames, while an interblock encoding encodes a macroblock in a manner that refers to one or more macroblocks in past and/or future frames. One of ordinary skill will realize that other embodiments might use other encoding schemes.

Figure 2:
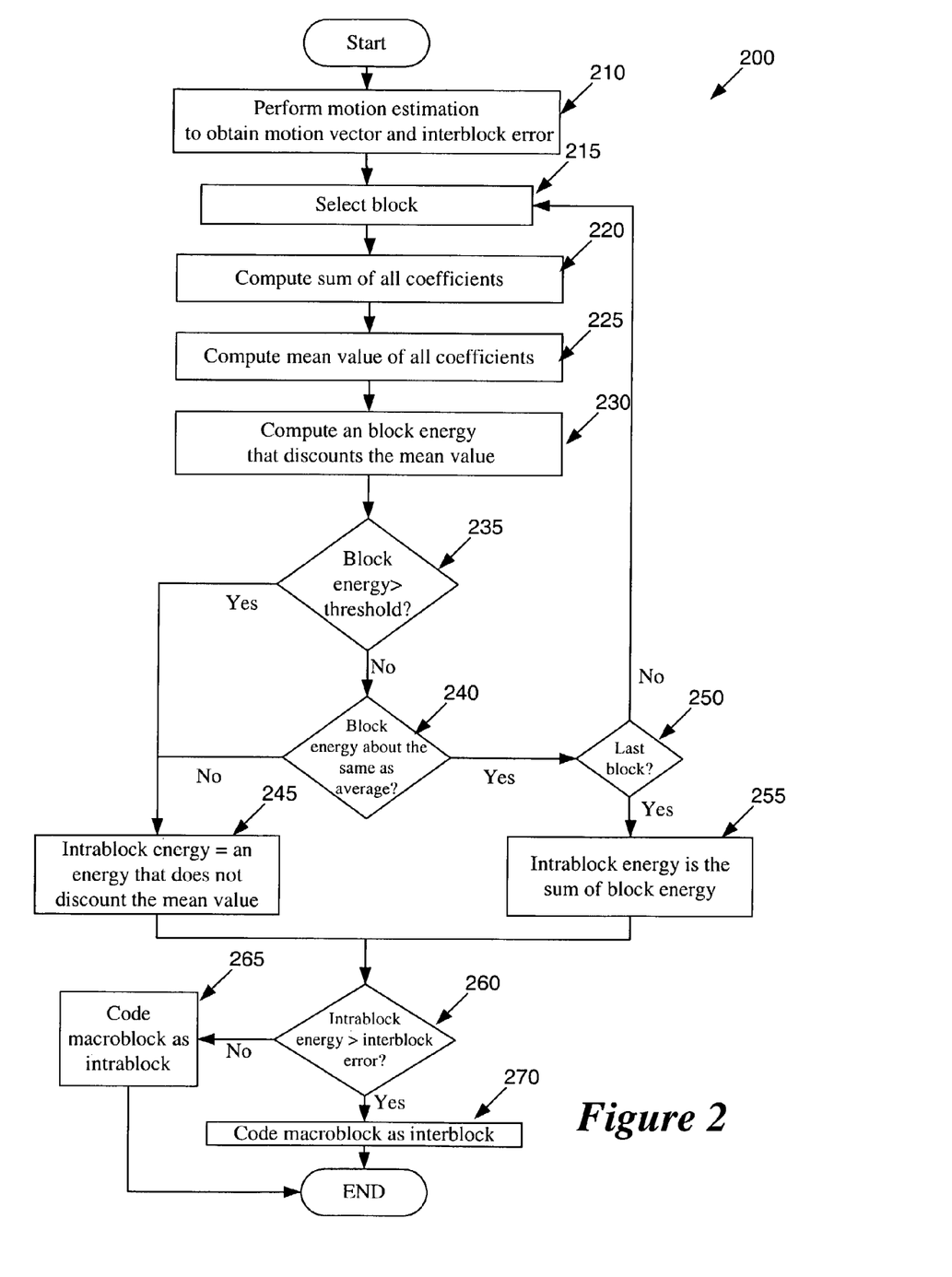
FIG. 2 illustrates a process of some embodiments of the invention.

FIG. 2 illustrates a process 200 of some embodiments of the invention. This process determines whether to encode a macroblock as an interblock or an intrablock, and then encodes the macroblock accordingly. This process starts each time it receives a macroblock. As shown in FIG. 2, this process initially performs (at 210) a motion estimation operation that identifies a motion vector and an estimated error.

To perform this operation, some embodiments use standard motion estimation operations that are well known in the art. Others use adaptive motion estimation operations that are disclosed in U.S. patent application Ser. No. 10/427,891, entitled "Adaptive Motion Estimation," filed on Apr. 30, 2003, now U.S. Pat. No. 7,239,721. This application is incorporated herein by reference.

The motion estimation operation at 210 identifies a motion vector that specifies how much the current-frame macroblock has moved since it appeared in a reference frame. A motion estimator can identify this motion vector by searching for a macroblock in the reference frame that most closely matches the current-frame macroblock. It identifies the best reference-frame macroblock that it encounters during its search and uses this reference-frame macroblock to specify the motion vector.

The estimated error generated by a motion estimation operation at 210 quantifies the difference between the current-frame macroblock and the best reference-frame macroblock that it encountered during its search (i.e., the reference-frame macroblock that it used to identify the motion vector). Different embodiments use different error metrics to quantify the estimated error. Some embodiments use the sum of absolute difference ("SAD") metric. This metric quantifies the error as the absolute value of the difference between luminance values and of the current-frame macroblock and the best reference-frame macroblock. This metric can be expressed as follows:

$$\text{SAD} = \sum_i |x_i - y_i|,$$

where $x_i$ is a luminance value in the current frame, $y_i$ is the ith luminance value in the reference frame, and i is a variable from 1 to the number of pixels in the macroblocks. This error is referred to below as the interblock error.

After 210, the process selects (at 215) one of the four-luminance block of the received macroblock. It then computes (at 220) the sum of all the luminance coefficients in the block selected at 215. From the sum, it then computes (at 225) the mean value M of all the luminance coefficients. Next, the process computes (at 230) a block energy for the selected block based on the following formulation:

$$\text{Block\_Energy} = \sum_i |x_i - M|.$$

In the equation above, the block energy is equal to the sum of the absolute value of the difference between each luminance value of the block and the mean value computed at 225.

After 230, the process determines (at 235) whether the block energy computed at 230 is greater than a threshold. If not, the process determines (a 240) whether the block energy computed at 230 for the selected block is within a threshold of (i.e., is close to) an average block energy for the received macroblock. The threshold used at 240 may or may not be the same as the threshold used at 235. When the block selected at 215 is the first selected block of the macroblock, the average block energy simply equals the block energy of the selected block. However, when the block selected at 215 is not the first selected block, this average is the average of all the block energies that the process 200 identifies (at 230) for the selected blocks of the received macroblock.

If the process determines (at 240) that the block energy is close to the average block energy, it determines (at 250) whether it has examined all the blocks of the received macroblock. If not, the process transitions back to 215 to select an unexamined block of the macroblock, and to repeat the operations after 215 for this selected block.

When the process determines (at 250) that it has examined all the blocks of the macroblock, the process defines (at 255) the intrablock energy of the macroblock as the sum of the block energies computed successively at 230. From 255, the process transitions to 260, which is further described below.

When the process determines (at 235) that a block energy is greater than a threshold or determines (at 240) that a block energy is not close to the average block energy, the process transitions to 245. At 245, the process uses an existing energy-computing scheme to compute the intrablock energy (e.g., compute the block's energy as the sum of the coefficient values of all pixels in the block) of the macroblock.

After 245, the process transitions to 260. At 260, the process determines whether the macroblock's intrablock energy is greater than the macroblock's interblock error, which was identified at 210. If not, the process 200 starts an encoding process (at 265) to encode the macroblock as an intrablock. Otherwise, the process 200 starts an encoding process (at 270) to encode the macroblock as an interblock. To encode a macroblock as an intrablock or interblock, the process can use any one of the known techniques in the art. It should be noted that the interblock encoding process might determine to designate the macroblock as "not coded" if it determines that the macroblock is identical or very close to a macroblock in a reference frame (e.g., the pervious frame). After 265 and 270, the process ends.

The process 200 has several advantages. For instance, the process accounts for the texture of a macroblock in determining how to encode the macroblock. It does this by taking out the mean value of flat macroblock in order to compute its intrablock energy. Hence, by more accurately computing the intrablock energy of flat macroblocks, it can determine more accurately when it needs to intrablock encode a macroblock, and thereby avoid artifacts that "hide" in flat macroblocks that would otherwise be interblock encoded. Encoding flat intrablocks is also computationally efficient as the number of transform coefficients in such cases is more limited.

Figure 3:
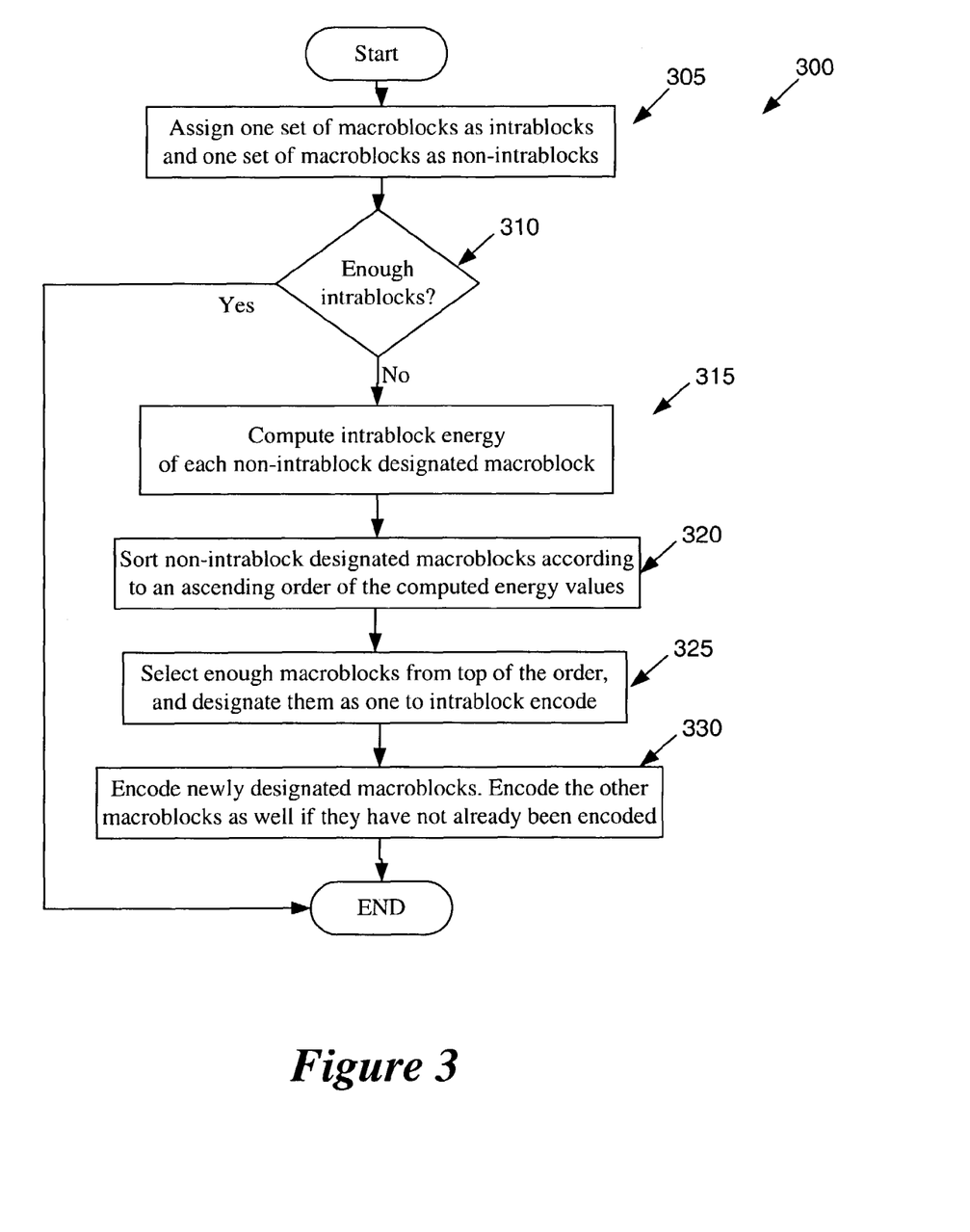
FIG. 3 illustrates an encoding process of some embodiments of the invention.

FIG. 3 illustrates an encoding process 300 of some embodiments of the invention. This process encodes a video frame that includes several macroblocks. To encode a frame, the process 300 first determines (at 305) to encode a first set of macroblocks in the frame as intrablocks and a second set of macroblocks in the frame as non-intrablocks (where non-intrablocks includes interblocks and not-coded blocks). To designate these macroblocks, the process 300 can use a variety of conventional approaches. Alternatively, it can use the process 200, or a variation of the process 200 that does not actually perform interblock and intrablock encoding operations at 265 and 270, but rather simply designates the macroblocks as intrablocks and non-intrablocks respectively at 265 and 270.

After 305, the process 300 determines (at 310) whether the frame has a sufficient number of intrablock-encoded macroblocks. The process makes this determination differently in different embodiments. In some embodiments, this determination is based on one or more criteria that are not dependent on the content of the macroblocks of the frame. For instance, some of these embodiments make the determination (at 310) based on the bandwidth of the medium across which the video is to be supplied and/or the expected rate of loss of data across this bandwidth.

If the process determines (at 310) that the frame has sufficient number of intrablock-encoded macroblocks, it terminates. Otherwise, if the process determines that the frame need an additional number N of intrablock-encoded macroblock, the process identifies (at 315) the intrablock energy of each particular macroblock that was not designated as an intrablock at 305. From the set of macroblocks identified at 315, the process 300 in some embodiments excludes macroblocks that were intrablock encoded at least once in the past X frames, where X is an integer. In other words, if a macroblock is intrablock encoded in a frame, some embodiments might not allow the corresponding macroblocks in the next X frames to be intrablock encoded.

When the process 300 uses the process 200 to initially come up with the designations at 305, the process simply retrieves (at 315) the intrablock energy values that the process 200 computed (at 245 and 255) for the non-intrablock designated macroblocks identified at 315. In this case, a flat macroblocks has it intrablock energy computed in a manner that discounts the mean average value of the macroblock, as discussed above.

The process 300 then sorts (at 320) the identified, non-intrablock designated macroblocks in an ascending order of their computed intrablock energy values (i.e., sorts from the smallest computed energy value to the largest computed energy value). The process next selects (at 325) the first N macroblocks on the specified order, and designates them as macroblocks that need to be intrablock encoded. The process then encodes (at 330) the newly designated macroblocks, and if the other macroblocks were not previously encoded, encodes the other macroblocks as well. After 330, the process ends.

Figure 4:
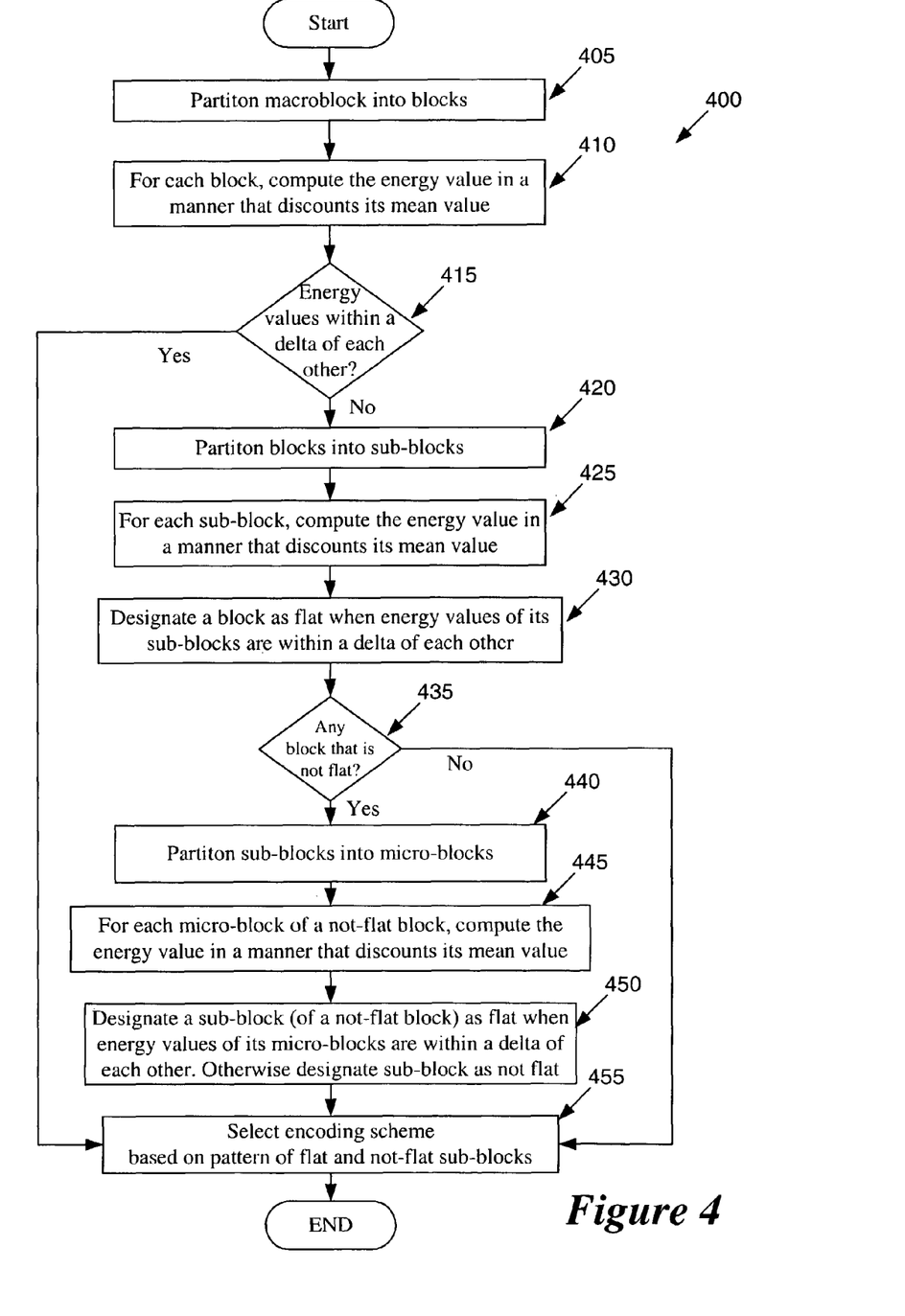
FIG. 4 illustrates a process that some embodiments use to encode a macroblock.
Figure 5:
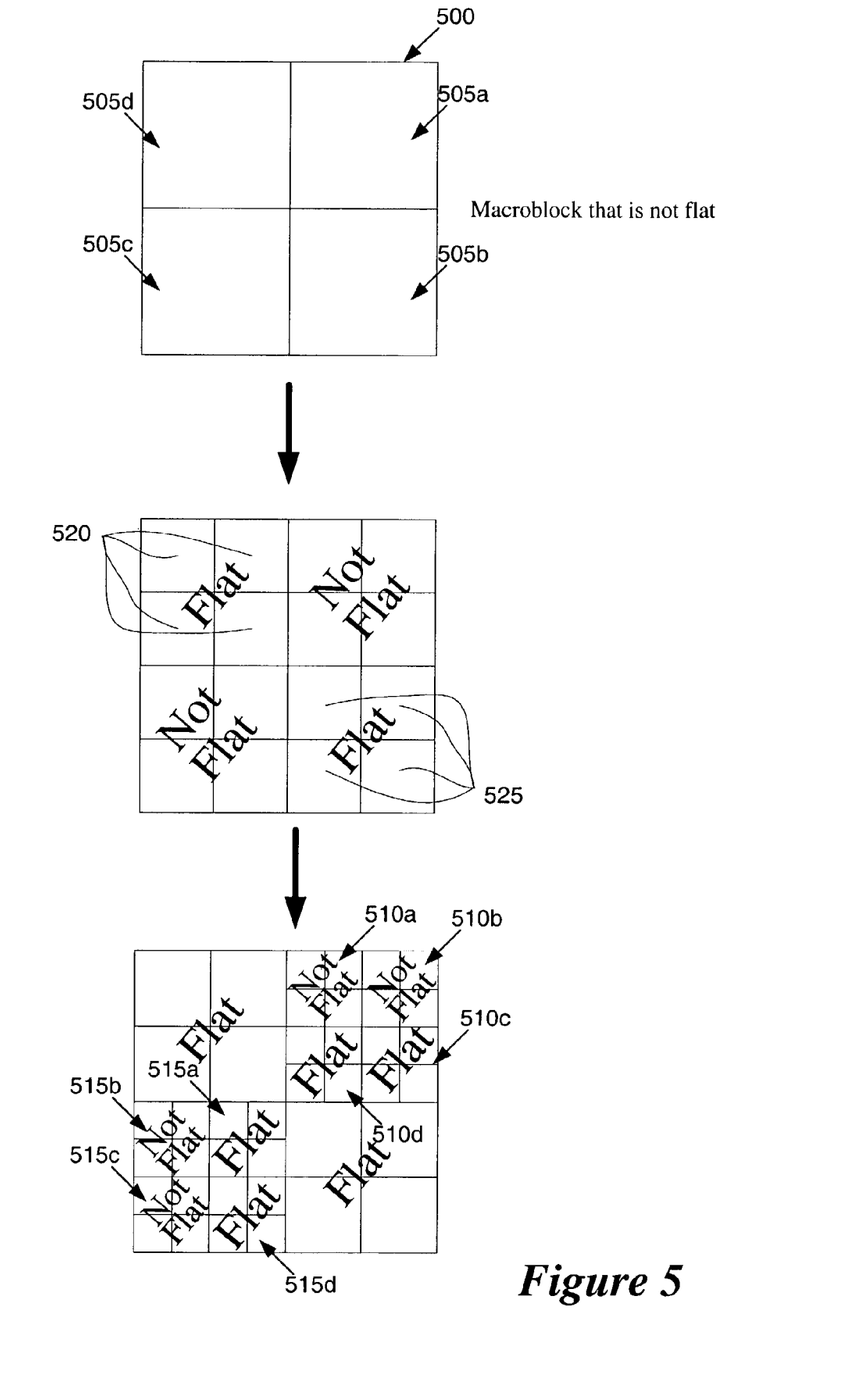
FIG. 5 illustrates an example that is used to describe the process of FIG. 4.

FIG. 4 illustrates a process 400 that some embodiments use to encode a macroblock. This process will be described by reference to an example of a macroblock 500 illustrated in FIG. 5. As shown in FIG. 4, the process 400 initially partitions (at 405) a 16-by-16 macroblock into four 8-by-8 blocks. FIG. 5 illustrates the macroblock 500 divided into four blocks 505*a*-505*d*.

For each block of the macroblock, the process 400 then computes (at 410) a block-energy value in a manner that discounts mean average image value of the block. In some embodiments, the process 400 computes such a block-energy value by performing the above-described operations 220-230 of FIG. 2. The process then determines (at 415) whether the computed block-energy values are within a threshold value of each other (i.e., whether the difference between the computed values of any pair of blocks in the macroblock is not more than the threshold value).

If the process determines (at 415) that the computed block-energy values are within a threshold value of each other, it transitions to 455, which is described below. Otherwise, the process partitions (at 420) each block into four 4-by-4 sub-blocks. For each sub-block of each block, the process 400 then computes (at 425) a sub-block-energy value in a manner that discounts mean average image value of the sub-block. In some embodiments, the process 400 computes such a sub-block-energy value by performing the above-described operations 220-230 of FIG. 2. The process then designates (at 430) a block as a flat block when the computed energy values for its sub-blocks are within a threshold value of each other.

In the example illustrated in FIG. 5, the blocks 505*b* and 505*d* are designated as flat as the computed energy values for their sub-blocks 520 and 525 are within a threshold value of each other. The blocks 505*a* and 505*c* have not been designated as flat as the computed energy values for their sub-blocks 510 and 515 are not within a threshold value of each other.

The process then determines (at 435) whether any of the blocks have not been designated as flat blocks. If not, the process transitions to 455, which is described below. Otherwise, the process partitions (at 440) each sub-block into four 2-by-2 micro-blocks. For each micro-block that is in a block that is not flat, the process 400 then computes (at 445) a micro-block-energy value in a manner that discounts mean average image value of the micro-block. In some embodiments, the process 400 computes such a micro-block-energy value by performing the above-described operations 220-230 of FIG. 2. When the computed energy values for a sub-block's micro-blocks are within a threshold value of each other, the process then designates (at 450) the sub-block (which is in a block that is not flat) as a flat sub-block. At 450, the process also designated sub-blocks that are within flat block as flat sub-blocks.

In the example illustrated in FIG. 5, each of the sub-blocks 510*c*, 510*d*, 515*a*, and 515*d* is designated as flat as the computed energy values for its micro-blocks are within a threshold value of each other. On the other hand, each of the sub-blocks 510*a*, 510*b*, 515*b*, and 515*c* is not designated as flat as the computed energy values for its micro-blocks are within a threshold value of each other.

After 450, the process 400 selects (at 455) an encoding scheme based on the pattern of flat and not-flat sub-blocks within the macroblock. As there are sixteen sub-blocks, the pattern of flat and not-flat sub-blocks within a macroblock translates into a 16-bit binary value (where "1" can designate flat and "0" can designate not-flat, or vice versa). This 16-bit binary value can be used to identify a reference in a look-up table to a particular encoding module. After 455, the process 400 ends. By identifying the pattern of flat and not-flat sections of a macroblock, the process 400 can selects an encoding scheme that is customized for a particular pattern in a macroblock. For instance, the customized encoding schemes can be the different encoding schemes that are specified by the newer MPEG 4 standards.

In some embodiments, the selection of the encoding scheme at 455 is not based solely on the pattern of flat and not-flat sub-blocks within the macroblock. This selection can also be based on other factors such as those described above, i.e., such as the intrablock and interblock energy values and the prior intrablock encoding of the macroblock. For instance, some embodiments use other considerations (e.g., use intrablock/interblock energies and use the duration to prior intrablock encoding) to first determine whether to intrablock encode or interblock encode a macroblock. Once these embodiments have selected either the intrablock or interblock encoding style, these embodiments then use the process 400 to identify the pattern of flat/not-flat sub-blocks, and to select one of encoding schemes that is specified for the selected encoding style by the newer MPEG 4 standards.

Figure 6:
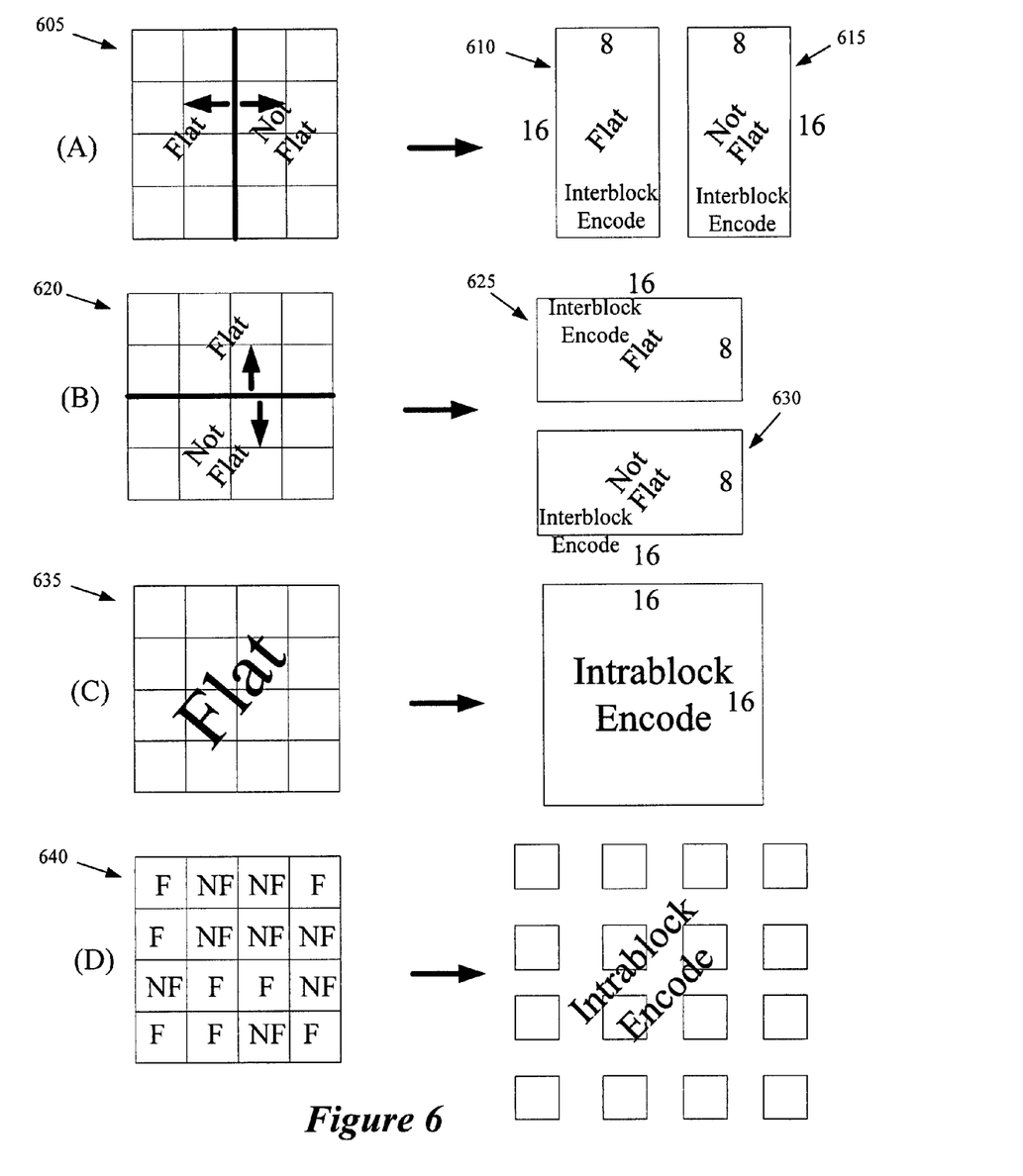
FIG. 6 illustrates several examples of using different encoding schemes for different patterns within a macroblock.

FIG. 6 illustrates several examples of using different encoding schemes for different patterns within a macroblock. Part (A) of this figure illustrates a macroblock 605 that has been designated for interblock encoding and that has a flat left half and a not-flat right half. As shown in Part (A), this macroblock can be interblock encoded by specifying two different interblock prediction vectors for the left and right halves 610 and 615 of the macroblock (i.e., for two 8-by-16 sections of the macroblock).

Similarly, Part (B) of FIG. 6 illustrates a macroblock 620 that has been designated for intrablock encoding and that has a flat top half and a not-flat bottom half. As shown in Part (B), this macroblock can be interblock encoded by specifying two different interblock prediction vectors for the top and bottom halves 625 and 630 of the macroblock (i.e., for two 16-by-8 sections of the macroblock).

Part (C) of FIG. 6 illustrates a macroblock 635 that has been designated for intrablock encoding and that is completely flat. As shown in Part (C), this macroblock can be intrablock encoded in its entirety with or without reference to another section in the same frame. Part (D) of FIG. 6 illustrates a macroblock 640 that has been designated for intrablock encoding and that has an arbitrary arrangement of flat and not-flat sub-blocks. As shown in Part (D), this macroblock can be intrablock encoded by specifying different intrablock prediction directions for each of the sixteen sub-blocks.

Figure 7:
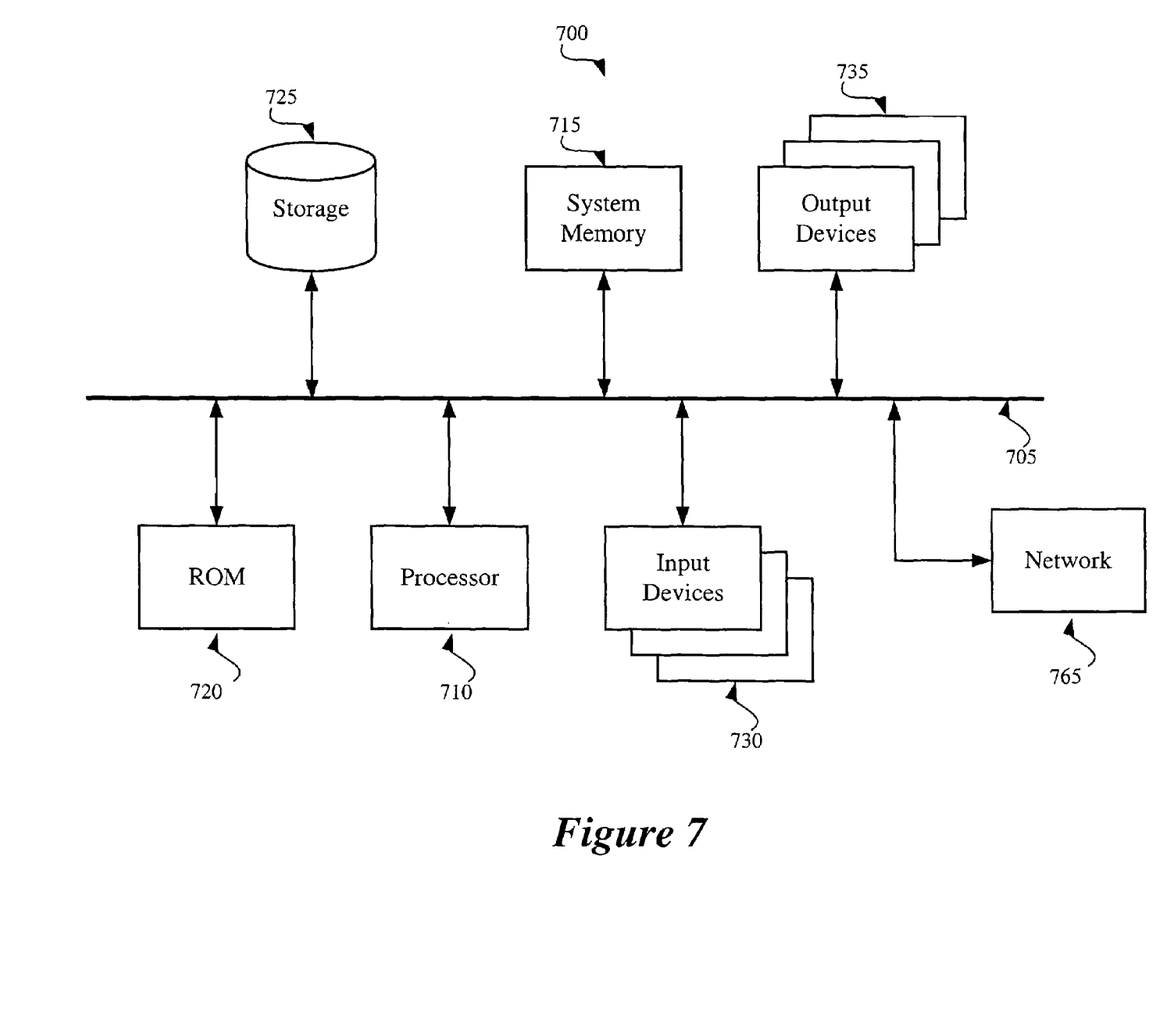
FIG. 7 illustrates a computer system with which one embodiment of the invention is implemented.

FIG. 7 presents a computer system with which one embodiment of the invention is implemented. This computer system can be a standalone computer or it can be part of another device, such as a DVD player, video player, etc. Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725.

From these various memory units, the processor 710 retrieves instructions to execute and data to process in order to execute the processes of the invention. The read-only-memory (ROM) 720 stores static data and instructions that are needed by the processor 710 and other modules of the computer system.

The permanent storage device 725, on the other hand, is read-and-write memory device. This device is a non-volatile memory unit that stores instruction and data even when the computer system 700 is off. Some embodiments of the invention use a mass-storage device (such as a magnetic or optical disk and its corresponding disk drive) as the permanent storage device 725.

Other embodiments use a removable storage device (such as a floppy disk or Zip® disk, and its corresponding disk drive) as the permanent storage device. Like the permanent storage device 725, the system memory 715 is a read-and-write memory device. However, unlike storage device 725, the system memory is a volatile read-and-write memory, such as a random access memory. The system memory stores some of the instructions and data that the processor needs at runtime. In some embodiments, the invention's processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keyboards and cursor-controllers. The output devices 735 display images generated by the computer system. For instance, these devices display IC design layouts. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet) or a network of networks (such as the Internet). Any or all of the components of computer system 700 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, even though some of the embodiments were described above by reference to macroblocks, one of ordinary skill will realize that other embodiments might apply the invention to other groupings of pixels. Also, even though the process 400 stops designating the flat/not-flat state at the sub-block level, some embodiments continue this operation to the lower micro-block level (i.e., they designate micro-blocks flat or not flat by comparing the individual pixels within the micro-blocks). Thus, one of ordinary skill in the art would understand that the invention is not to be limited by the foregoing illustrative details, but rather is to be defined by the appended claims.

We claim:

1. A method of encoding a particular section of an image of a video signal that includes a plurality of successive images, each image comprising a plurality of sections, each section comprising a set of sub-sections, each sub-section having a set of image pixel values and an energy value, the method comprising:
   determining whether the sub-section energy values in the particular section are centered about a same value;
   using a first equation to compute a first metric score for the particular section when the particular section's sub-section energy values are centered about the same value;
   using a second equation to compute a second metric score for the particular section when the particular section's sub-section energy values are not centered about the same value, wherein the second equation computes the second metric score as a section energy that does not discount an average value of any sub-section's image pixel values;
   selecting an encoding scheme from a set of encoding schemes based on the computed metric score, the set of encoding schemes comprising an intrablock encoding scheme that encodes the particular section without reference to any other section and an interblock encoding scheme that encodes the particular section by reference to at least one section of another image; and
   encoding the particular section according to the selected encoding scheme.

2. The method of claim 1, wherein determining whether the sub-section energy values of the particular section are centered about the same value comprises comparing the energy value of each sub-section with energy value of the other sub-sections.

3. The method of claim 2, wherein comparing the energy value of each sub-section with energy values of the other sub-sections comprises:
   for a first sub-section, computing a first energy value that expresses a the deviation of the image pixel values of the first sub-section from an average of the image pixel values of the first sub-section;
   for a second sub-section, computing a second energy value that expresses the deviation of the image pixel values of the second sub-section from an average of the image pixel values of the second sub-section;
   determining whether a difference between the first and second energy values is more than a first threshold; and
   when the difference between the first and second energy values is more than the first threshold, specifying that the particular section's image pixel values are not centered about the same value.

4. The method of claim 3, wherein computing the energy value for a particular sub-section comprises:
   computing the average of the image pixel values of the particular sub-section; and
   summing an absolute value of the difference of each image pixel value of the particular sub-section and the computed average.

5. The method of claim 4, wherein the image pixel values are luminance values.

6. The method of claim 3 further comprising:
   before computing the second energy value, determining whether the first energy value is greater than a second threshold; and
   when the first energy value is greater than the second threshold, specifying that the particular sub-section's image pixel values are not centered about a same value and using the second equation to compute the second metric score for the particular section.

7. The method of claim 6 further comprising:
   for each particular sub-section of the particular section, iteratively:
      computing an energy value that expresses the deviation of the image pixel values of the particular sub-section from the average of the image pixel values of the particular sub-section;
      determining whether the computed energy value for the particular sub-section exceeds, by a third threshold, the average of previously computed energy values for the other sub-sections of the particular section;
      when the computed energy value for the particular sub-section exceeds the average by the third threshold, specifying that the particular section's sub-section energy values are not centered about the same value; and
      when the computed energy value of all sub-sections of the particular section are within the first threshold of the average of the computed energy values and none of the computed energy values exceeds the second threshold, specifying that the particular section's sub-section energy values are centered about the same value.

8. The method of claim 1, wherein the first and second metric scores are estimates of errors for performing encoding according to the intrablock encoding scheme, the method further comprising:

identifying an estimate of the error for performing encoding according to the interblock encoding scheme; and determining whether to select the intrablock encoding scheme or the interblock encoding scheme based on a comparison of the computed first or second metric score with the identified error estimate for the interblock encoding scheme.

9. The method of claim 1, wherein the first equation is an equation that discounts an average image pixel value of each of at least two sub-sections.

10. The method of claim 1, wherein the second equation computes the second metric score as a section energy that is a sum of the particular section's image pixel values.

11. A method of encoding a particular section of an image from a plurality of images, the particular section comprising a plurality of sub-sections, each sub-section having a set of image pixel values and an energy value, the method comprising:

when the particular section's sub-section energy values are within a threshold value of each other, computing a first metric score for the particular section by using a first equation;

when the particular section's sub-section energy values are not within the threshold value of each other, computing a second metric score for the particular section by using a second equation, wherein the second equation computes the metric score as a section energy that does not discount a mean value of any sub-section's image pixel values, wherein the second computed metric score is an intrablock energy that estimates an error for encoding the particular section with an intrablock encoding scheme; and based on the computed metric score, selecting an encoding scheme from a plurality of encoding schemes for encoding the particular section, wherein the plurality of encoding schemes comprises an intrablock encoding scheme that encodes the particular section without reference to any other section and an interblock encoding scheme that encodes the particular section by reference to at least another section.

12. The method of claim 11, wherein the first equation is an equation that discounts an average image pixel value of each of at least two sub-sections.

13. The method of claim 11, wherein the first metric score is an error estimate for performing encoding according to the intrablock encoding scheme, the method further comprising:

identifying an estimate of the error for performing encoding according to the interblock encoding scheme; and determining whether to select the intrablock encoding scheme or the interblock encoding scheme based on a comparison of the computed first or second metric score with the identified error estimate for the interblock encoding scheme.

14. The method of claim 11 further comprising before computing the first or second metric score, comparing the energy value of each sub-section with energy values of the other sub-sections.

15. The method of claim 14, wherein comparing the energy value of each sub-section with energy values of the other sub-sections comprises:

for a first sub-section, computing a first energy value that expresses a deviation of the image pixel values of the first sub-section from an average of the image pixel values of the first sub-section;

for a second sub-section, computing a second energy value that expresses the deviation of the image pixel values of the second sub-section from an average of the image pixel values of the second sub-section; and determining whether the first and second energy values differ by more than a threshold value.

16. A non-transitory computer readable medium storing a computer program that when executed by at least one processor encodes a particular section of an image for a video signal that includes a plurality of successive images, wherein each image comprises a plurality of sections, wherein each section comprises a set of sub-sections, each sub-section having a set of image pixel values and an energy value, the computer program comprising sets of instructions for:

determining whether the sub-section energy values in the particular section are centered about a same value;

using a first equation to compute a first metric score for the particular section when the particular section's sub-section energy values are centered about the same value;

using a second equation to compute a second metric score for the particular section when the particular section's sub-section energy values are not centered about the same value, wherein the second equation computes the second metric score as a section energy that does not discount an average value of any sub-section's image pixel values;

selecting an encoding scheme from a set of encoding schemes based on the computed metric score, wherein the set of encoding schemes comprises an intrablock encoding scheme that encodes the particular section without reference to any other section and an interblock encoding scheme that encodes the particular section by reference to at least one section of another image; and encoding the particular section according to the selected encoding scheme.

17. The non-transitory computer readable medium of claim 16, wherein the set of instructions for determining whether the sub-section energy value in the particular section are centered about the same value comprises a set of instructions for comparing the energy value of each sub-section with energy values of the other sub-sections.

18. The non-transitory computer readable medium of claim 17, wherein the set of instructions for comparing the energy value of each sub-section with energy values of the other sub-sections comprises sets of instructions for:

computing, for a first sub-section, a first energy value that expresses a deviation of the image pixel values of the first sub-section from an average of the image pixel values of the first sub-section;

computing, for a second sub-section, a second energy value that expresses the deviation of the image pixel values of the second sub-section from an average of the image pixel values of the second sub-section;

determining whether the first and second energy values differ by more than a first threshold; and when the first and second energy values differ by more than the first threshold, specifying that the particular section's image pixel values are not centered about the same value.

19. The non-transitory computer readable medium of claim 16, wherein the second equation computes the second metric score as a section energy that is a sum of the particular section's image pixel values.

20. A non-transitory computer readable medium storing a computer program that when executed by at least one processor encodes a particular section of an image from a plurality of images, the particular section comprising a plurality of sub-sections, each sub-section having a set of image pixel values and an energy value, the computer program comprising sets of instructions for:

when the particular section's sub-section energy values are within a threshold value of each other, computing a first metric score for the particular section by using a first equation;

when the particular section's sub-section energy values are not within the threshold value of each other, computing a second metric score for the particular section by using a second equation, wherein the second equation computes the metric score as a section energy that does not discount a mean value of any sub-section's image pixel values, wherein the second computed metric score is an intrablock energy that estimates an error for encoding the particular section with an intrablock encoding scheme; and  based on the computed metric score, selecting an encoding scheme from a plurality of encoding schemes for encoding the particular section, wherein the plurality of encoding schemes comprises an intrablock encoding scheme that encodes the particular section without reference to any other section and an interblock encoding scheme that encodes the particular section by reference to at least another section.

21. The non-transitory computer readable medium of claim 20, wherein the first equation is an equation that discounts an average of the image pixel values of each of at least two sub-sections.

22. The non-transitory computer readable medium of claim 20, wherein the computer program further comprises a set of instructions for comparing, before computing the first or second metric score, the energy value of each sub-section with energy values of the other sub-sections.

23. The non-transitory computer readable medium of claim 22, wherein the set of instructions for comparing the energy value of each sub-section with energy values of the other sub-sections further comprises sets of instructions for:

computing, for a first sub-section, a first energy value that expresses a deviation of the image pixel values of the first sub-section from an average of the image pixel values of the first sub-section;

computing, for a second sub-section, a second energy value that expresses the deviation of image pixel values of the second sub-section from an average of the image pixel values of the second sub-section; and  determining whether the first and second energy values differ by more than a threshold value.

24. The non-transitory computer readable medium of claim 20, wherein the first metric score is an error estimate for performing encoding according to the intrablock encoding scheme, the computer program further comprising sets of instructions for:

identifying an estimate of the error for performing encoding according to the interblock encoding scheme; and  determining whether to select the intrablock encoding scheme or the interblock encoding scheme based on a comparison of the computed first or second metric score with the identified error estimate for the interblock encoding scheme.

* * * * *

UNITED STATES PATENT AND TRADEMARK OFFICE
CERTIFICATE OF CORRECTION

| | | |
|---|---|---|
| PATENT NO. | : 7,944,971 B1 | Page 1 of 1 |
| APPLICATION NO. | : 10/429101 | |
| DATED | : May 17, 2011 | |
| INVENTOR(S) | : Thomas Pun et al. | |

It is certified that error appears in the above-identified patent and that said Letters Patent is hereby corrected as shown below:

On sheet 4 of 7, in Figure 4, Box 405, line 1, delete "Partiton" and insert -- Partition --, therefor.

On sheet 4 of 7, in Figure 4, Box 420, line 1, delete "Partiton" and insert -- Partition --, therefor.

On sheet 4 of 7, in Figure 4, Box 440, line 1, delete "Partiton" and insert -- Partition --, therefor.

In column 10, line 4, in claim 2, delete "value" and insert -- values --, therefor.

In column 10, line 10, in claim 3, after "expresses a" delete "the".

In column 12, line 38, in claim 17, delete "value" and insert -- values --, therefor.

Signed and Sealed this
Twenty-seventh Day of December, 2011

David J. Kappos
*Director of the United States Patent and Trademark Office*